(12) United States Patent
Ito et al.

(10) Patent No.: US 7,016,195 B2
(45) Date of Patent: Mar. 21, 2006

(54) COOLING FLUID PUMP AND ELECTRIC APPARATUS, SUCH AS PERSONAL COMPUTER, PROVIDED WITH THE PUMP

(75) Inventors: Kenichi Ito, Zama (JP); Katsuya Seko, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 10/721,172

(22) Filed: Nov. 26, 2003

(65) Prior Publication Data

US 2004/0105232 A1    Jun. 3, 2004

(30) Foreign Application Priority Data

Nov. 28, 2002 (JP) .............................. 2002-345769

(51) Int. Cl.
*H05K 7/20* (2006.01)

(52) U.S. Cl. ...................... 361/699; 361/698; 361/687; 165/80.3; 174/15.1; 417/55.1; 417/423.8; 417/354

(58) Field of Classification Search ........ 361/687–689, 361/698–699, 700–709; 174/15.1; 257/714, 257/715, 716; 165/80.3, 80.5, 104.33, 104.34, 165/122, 185; 417/55.1, 420, 423.8, 423.14; 62/252.1, 252.2
See application file for complete search history.

(56) References Cited

U.S. PATENT DOCUMENTS

| 6,327,145 | B1 * | 12/2001 | Lian et al. ................... 361/697 |
| 6,408,937 | B1 * | 6/2002 | Roy ....................... 165/104.33 |
| 6,832,646 | B1 * | 12/2004 | Uomori et al. ............ 165/80.2 |
| 6,839,234 | B1 * | 1/2005 | Niwatsukino et al. ...... 361/695 |
| 2003/0072656 | A1 * | 4/2003 | Niwatsukino et al. ...... 417/354 |

FOREIGN PATENT DOCUMENTS

| JP | 2001-123677 | | 5/2001 |
| JP | 2001-123978 | | 5/2001 |
| JP | 2002094276 A | * | 3/2002 |
| JP | 20022151638 A | * | 5/2002 |

* cited by examiner

*Primary Examiner*—Michael Datskovskiy
(74) *Attorney, Agent, or Firm*—Pillsbury Winthrop Shaw Pittman, LLP

(57) ABSTRACT

A cooling fluid pump in which a cooling fluid is caused to flow to cool a heating element includes a casing brought into a direct contact or an indirect contact via a heat transfer member with the heating element, a pump chamber defined in the casing, an impeller rotatably mounted in the pump chamber and including a pump groove formed in either one of both axial end faces, the impeller having an axis of rotation located radially away from a center of the casing, an inlet formed in the casing so that the cooling fluid is supplied through the inlet into the pump chamber by an action of the pump groove with rotation of the impeller, and an outlet formed in the casing so that the cooling fluid is discharged through the outlet out of the pump chamber by an action of the pump groove with rotation of the impeller.

12 Claims, 6 Drawing Sheets

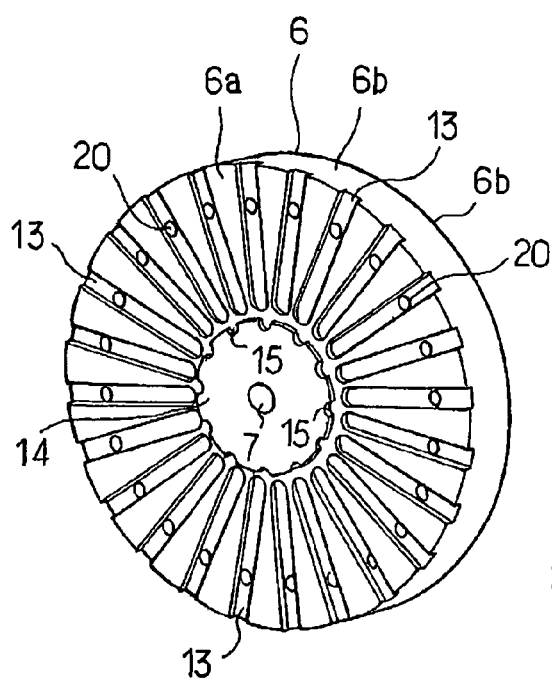 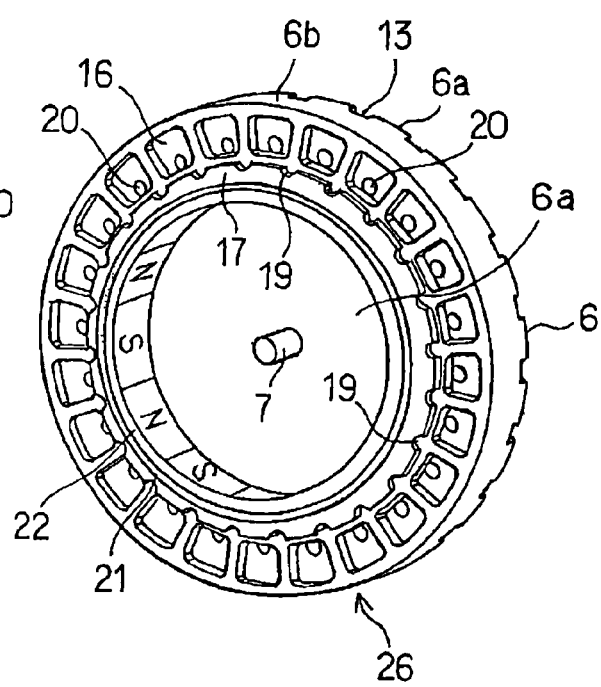
FIG. 4A  FIG. 4B

COOLING FLUID PUMP AND ELECTRIC APPARATUS, SUCH AS PERSONAL COMPUTER, PROVIDED WITH THE PUMP

BACKGROUND OF THE INVENTION

1. Field of the Invention

This invention relates to a fluid pump cooling heating elements composing electric apparatus and personal computers.

2. Description of the Related Art

Japanese patent publications, JP-A-2001-123978 and JP-A-2001-132677, disclose conventional fluid pumps, for example. Each disclosed fluid pump comprises a casing having a pump chamber therein, an inlet and an outlet both formed in the casing, a disc-like impeller rotatably provided in the pump chamber and having pump grooves through which a liquid in the pump chamber is supplied to a peripheral interior of the pump chamber. Upon rotation of the impeller, the liquid is sucked through the inlet into the pump chamber by the action of the pump grooves and the liquid in the pump chamber is discharged from the outlet by the action of the pump grooves.

When the foregoing fluid pump is used to cool a heating element of an electric apparatus, for example, the fluid pump and the heating element are disposed so that one side of the pump casing is brought into contact with the heating element. In this construction, heat generated by the heating element is absorbed via the casing into the liquid flowing in the pump chamber.

In the above-described fluid pump, however, the pump chamber is located generally in the center of the casing, and an axis of rotation of the impeller corresponds substantially with the center of the casing. Accordingly, the liquid passage located in the outer periphery of the impeller corresponds to the periphery of the casing. When the heating element is mounted substantially on the center of the side of the casing, the fluid passage in the pump chamber is located on the periphery of the heating element. Consequently, the heating element cannot be cooled efficiently.

SUMMARY OF THE INVENTION

Therefore, an object of the present invention is to provide a cooling fluid pump which can efficiently cool an object to be cooled.

The present invention provides a cooling fluid pump in which a cooling fluid is caused to flow to cool a heating element. The cooling fluid pump comprises a casing brought into a direct contact or an indirect contact via a heat transfer member with the heating element, a pump chamber provided in the casing, an impeller rotatably provided in the pump chamber and including a pump groove formed in either one of both axial end faces, the impeller having an axis of rotation located radially away from a center of the casing, an inlet formed in the casing so that the cooling fluid is supplied therethrough into the pump chamber by an action of the pump groove with rotation of the impeller, and an outlet formed in the casing so that the cooling fluid is discharged therethrough out of the pump chamber by an action of the pump groove with rotation of the impeller.

When the cooling fluid flows in the pump chamber with rotation of the impeller, heat generated by the heating element is absorbed via the casing into the fluid. In this case, since the axis of rotation of the impeller is located radially away from the center of the casing, a part of the fluid flowing in the pump chamber passes by the center of the casing. Accordingly, the fluid passage can be ensured near the heating element when the heating element is disposed near the center of the casing. Consequently, the heating element can be cooled efficiently.

BRIEF DESCRIPTION OF THE DRAWINGS

Other objects, features and advantages of the present invention will become clear upon reviewing the following description of the embodiment with reference to the accompanying drawings, in which:

FIG. 4A is a perspective view of an impeller as viewed in one direction;

FIG. 4B is a perspective view of the impeller as viewed in another direction;

DETAILED DESCRIPTION OF THE INVENTION

Figure 1:
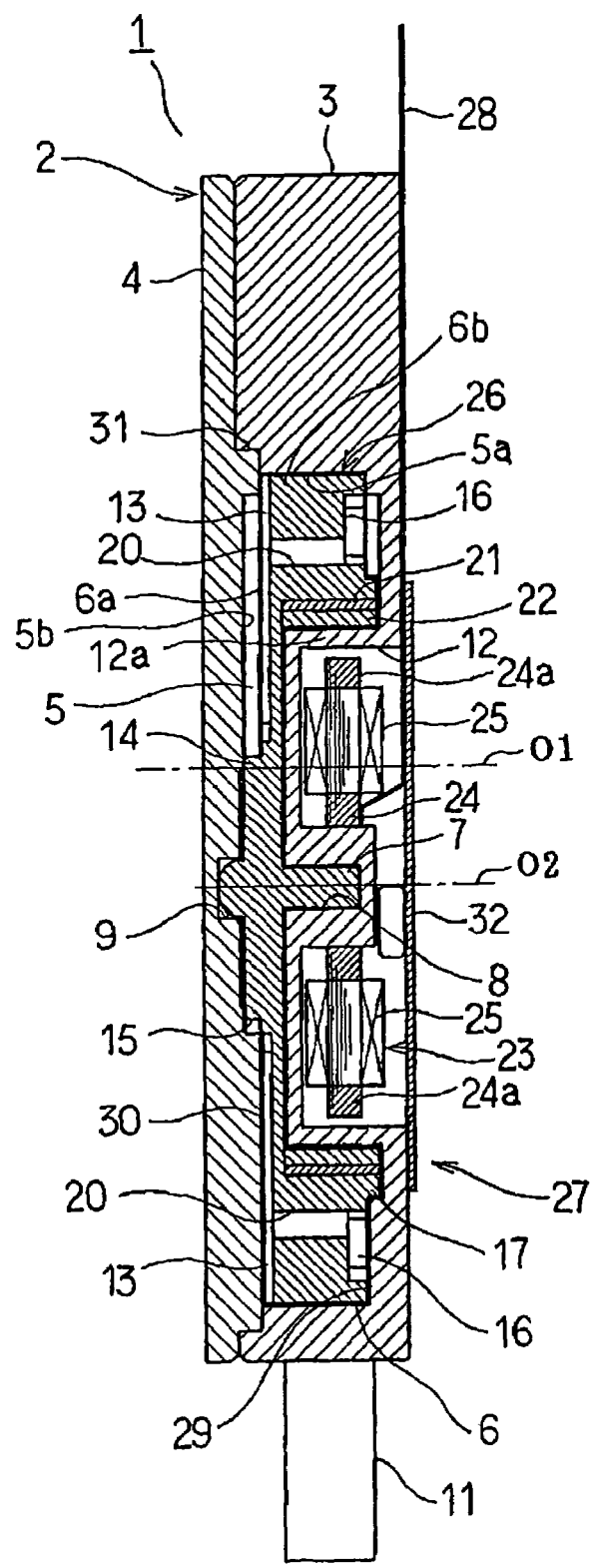
FIG. 1 is a longitudinal section of the cooling fluid pump showing an example of the present invention.
Figure 2:
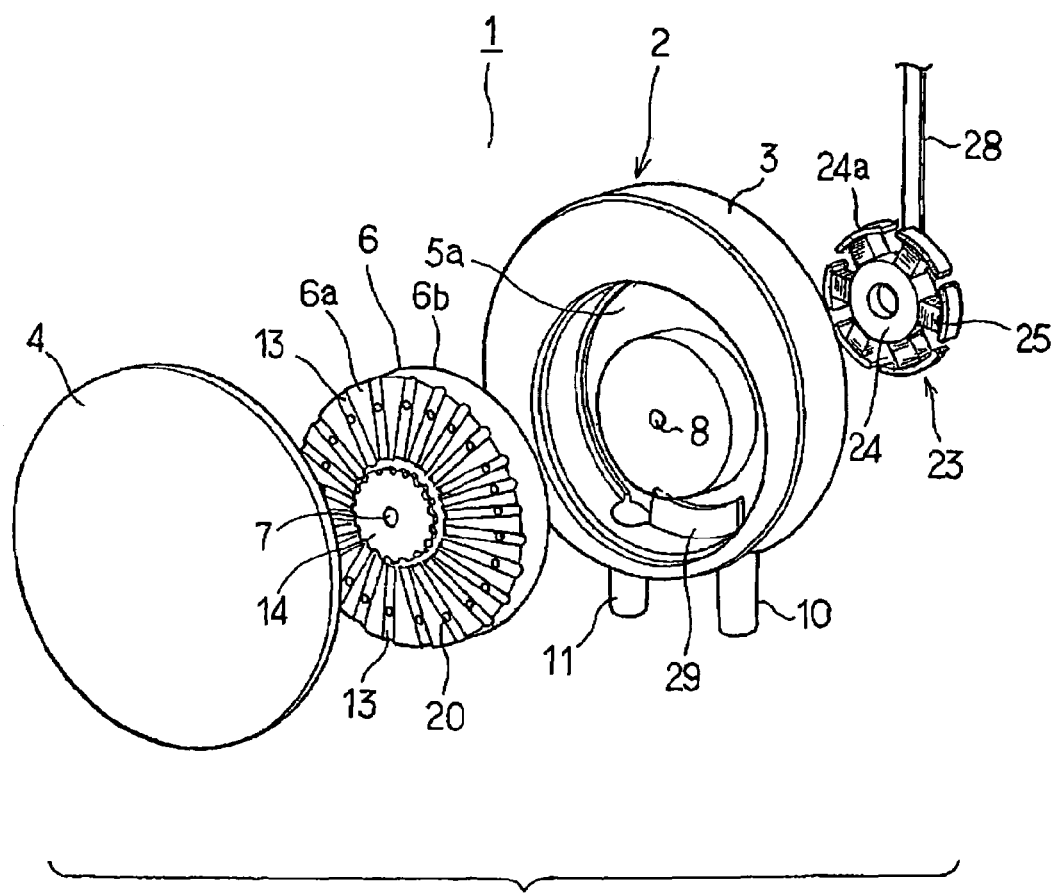
FIG. 2 is an exploded perspective view of the fluid pump as viewed at a second casing side.
Figure 3:
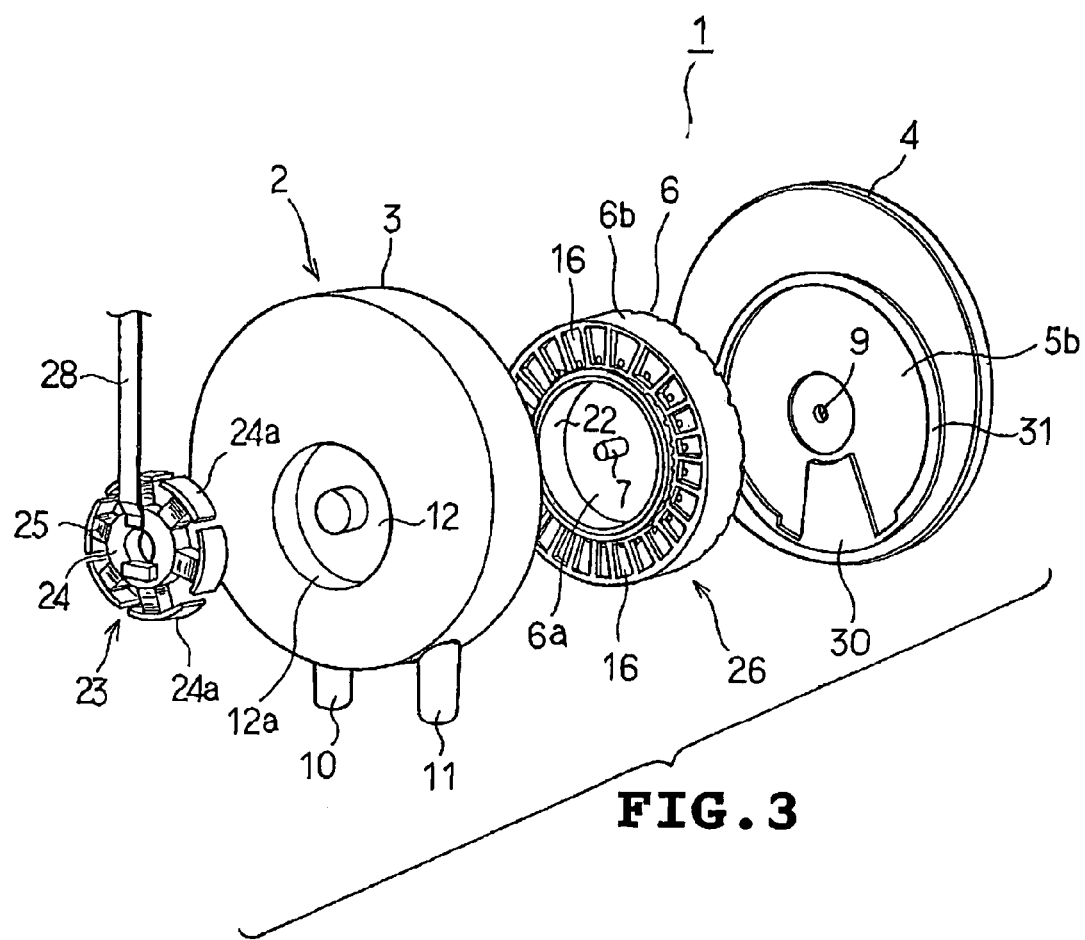
FIG. 3 is an exploded perspective view of the fluid pump as viewed at a first casing side.

One embodiment of the present invention will be described with reference to the drawings. The fluid pump of the invention is applied to a personal computer in the embodiment.

Referring to FIGS. 1 to 4B, the construction of the fluid pump will be described. The fluid pump 1 comprises a thin cylindrical casing 2 including first and second casings 3 and 4 and having a pump chamber 5 defined therein, and an impeller 6 rotatably mounted in the pump chamber 5. The first and second casings 3 and 4 are formed with concavities 5a and 5b respectively. Bearings 8 and 9 supporting a rotational shat 7 of the impeller 6 are provided in central portions of the concavities 5a and 5b respectively.

The pump chamber 5 is constructed so that the center thereof is located radially away from the center of the casing 2. More specifically, a straight line O2 passing the center of the pump chamber 5 and extending in parallel to the rotational shaft 7 of the impeller 6 is located radially away from a straight line O1 passing the center of the casing 2 and extending in parallel to the rotational shaft 7 of the impeller 6. The impeller 6 is disposed in the center of the pump chamber 5. Accordingly, the center of the rotational shaft 7, that is, the center of rotation of the impeller 6 is located on the straight line O2.

An inlet 10 and an outlet 11 are provided in an outer periphery of the first casing 3. The inlet 10 and the outlet 11 communicate with the pump chamber 5. The first casing 3 has a face which is opposed to the second casing 4 and in which a stator accommodating area 12 is provided. The stator accommodating area 12 is located in the center of the concavity 5a and axially overlaps the concavity. As the result of the above-described construction, the pump chamber 5 is defined between the periphery of the stator accommodating area 12 and the second casing 4 side end face of the stator accommodating area, and the second casing 4. The impeller 6 is composed so as to correspond to the configuration of the pump chamber 5 and includes a disc 6a and an annular convexity 6b located around the outer circumference of the disc 6a. The stator accommodating area 12 is surrounded by the disc 6a and the annular convexity 6b. A magnetic ring 21 is fixed to an inner circumference of the annular convexity 6b. An annular rotor permanent magnet 22 is fixed to an inner circumference of the magnetic ring 21. The permanent magnet 22 is magnetized so that the north and south magnetic poles appear alternately circumferentially.

A stator 23 is provided in the stator accommodating area 12. The stator accommodating area 12 is closed by a sheet 32 after the stator 23 has been disposed therein. The stator 23 comprises a stator core 24 having a plurality of magnetic poles 24a and stator windings 25 wound on the magnetic poles. A flexible flat cable 28 is connected to the stator winding 25. Each magnetic pole 24a has an outer circumferential face radially opposed to the inner circumferential face of the permanent magnet 22 with the circumferential wall 12a of the stator accommodating area 12 being located therebetween. The impeller 6, the magnetic ring 21 and the permanent magnet 22 constitute a rotor 26. The stator 23 and the rotor 26 constitute an electric motor 27.

A circular convexity 14 is formed on the central end face of the disc 6a of the impeller 6 at the second casing 4 side. The convexity 14 has a number of cavities 15 formed in the outer circumferential face thereof. The disc 6a has a number of radially extending first pump grooves 13 formed in the circumference of the convexity 14 of the second casing 4 side end face thereof. Each pump groove 13 extends to and is open at the outer circumference of the impeller 6. An annular convexity 17 is formed on the inner circumference of the first casing 3 side end face of the annular convexity 6b of the impeller 6. The disc 6a has a number of cavities 19 formed in the outer circumferential face of the convexity 17 as shown in FIG. 4B. The cavities 15 and 19 serve to efficiently direct a liquid in the pump chamber 5 in a radial direction during rotation of the impeller 6. Furthermore, since the first pump grooves 13 are open at the outer circumference, the liquid tends to easily flow through the first pump grooves 13 during rotation of the impeller 6. The impeller 6 has through holes 20 extending via the first and second pump grooves 13 and 16 axially through the impeller 6. When a gas such as air mixes with the liquid flowing in the pump chamber 5, the gas can be discharged through the holes 20 outside.

The first casing 3 has an arc protrusion 29 formed on a portion thereof located between the inlet 10 and the outlet 11 in the concavity 5a so as to extend along the circumferential wall of the concavity. The protrusion 29 is provided to reduce a gap between the annular convexity 6b and the concavity 5a. Furthermore, the second casing 4 has, a protrusion 30 formed on a portion of the concavity 5b correspond to the protrusion 29. The protrusion 30 is provided to reduce a gap between the disc 6a of the impeller 6 and the concavity 5b. Additionally, an arc protrusion 31 is formed on a portion of the concavity 5b in which the protrusion 30 is not provided. The protrusion 31 is formed along the inner circumferential face of the concavity 5b so as to be opposed to the outer circumference of the impeller 6.

Figure 5:
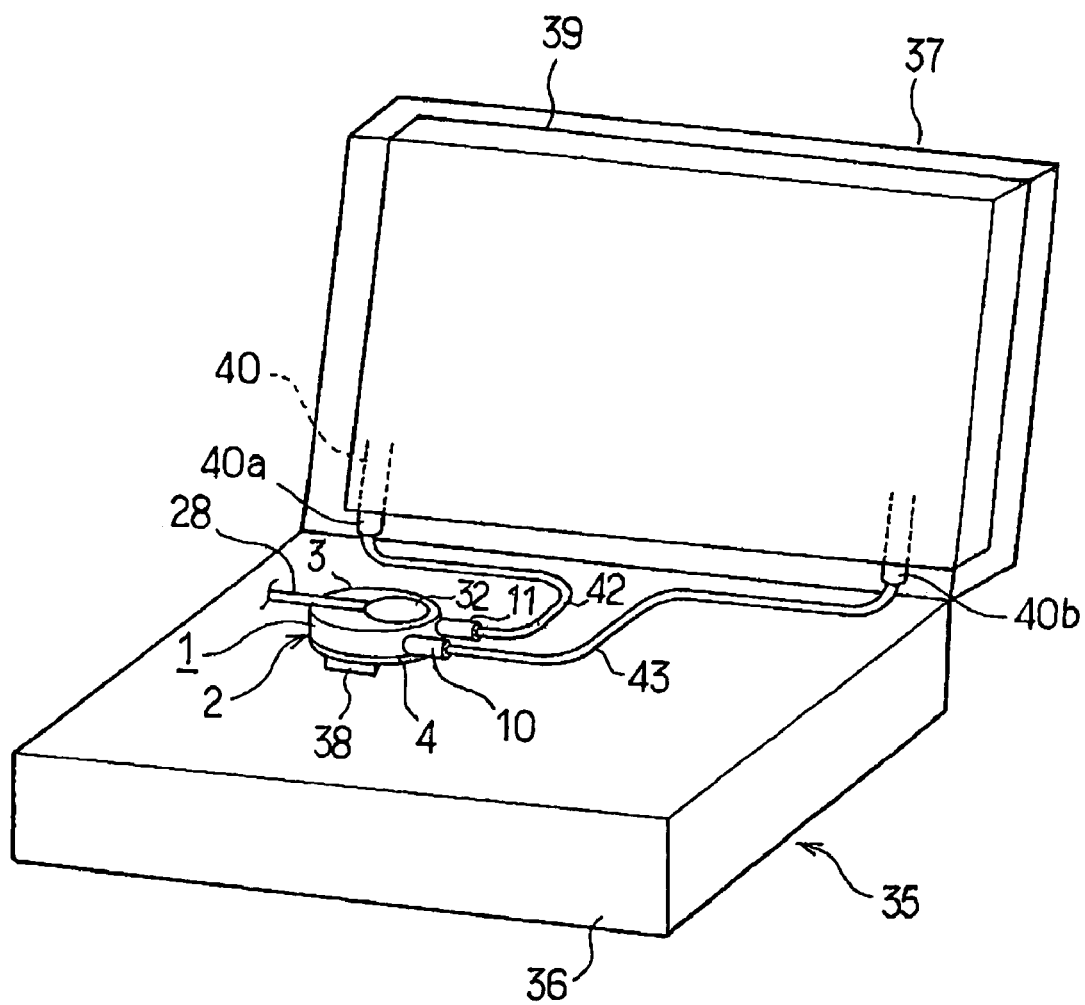
FIG. 5 is a schematic perspective view of a personal computer provided with the fluid pump.
Figure 6:
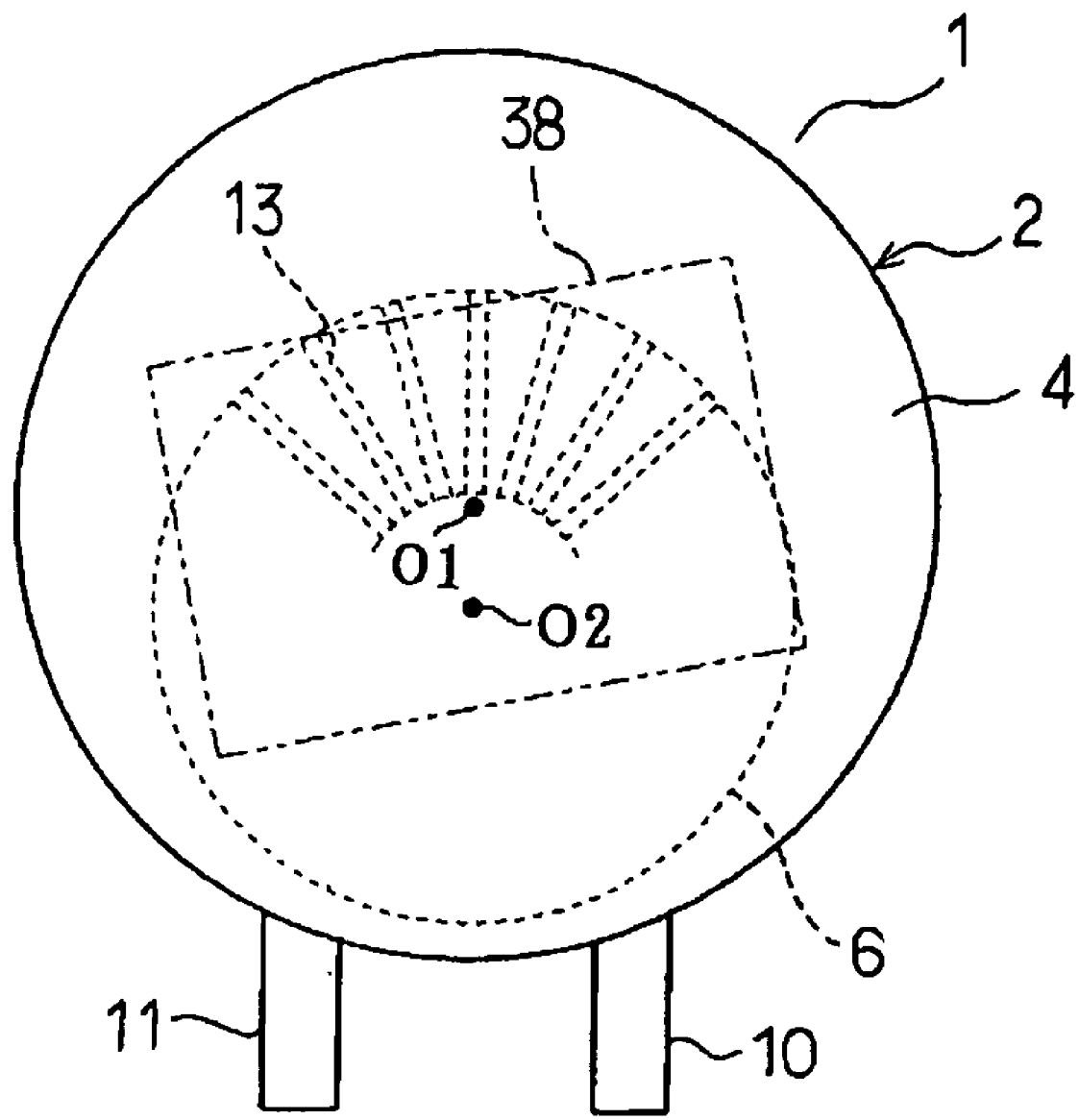
FIG. 6 is a bottom view of the fluid pump, explaining the arrangement of CPU.

FIG. 5 schematically illustrates a notebook type personal computer 35 serving as an electric apparatus to which the fluid pump 1 is applied. The personal computer 35 comprises a body casing 36, a cover casing 37 pivotally mounted on the body casing. A key board (not shown) is provided in an upper face of the body casing 36. A liquid crystal display (not shown) is provided on the cover casing 37 so as to be opposed to the upper face of the body casing 36. A heat radiating panel 39 is provided on a rear face of the liquid crystal display inside the cover casing 37. The heat radiating panel 39 is provided with a liquid passage 40 filled with a cooling liquid. The liquid passage 40 has both ends formed with an entrance 40a and an exit 40b respectively.

A rectangular box-like central processing unit (CPU) 38 is enclosed in the body casing 36. The CPU 38 serves as a heating member in the present invention. The fluid pump 1 is provided on the top of the CPU 38. More specifically, the top of the CPU 38 and the second casing 4 of the fluid pump 1 are in contact with each other, and the center of the CPU 38 and the center O1 of the casing 2 substantially agree with each other. A connecting tube 42 is connected to the outlet 11 of the cooling pump 1 and to the entrance 40a, whereas another connecting tube 43 is connected to the inlet 10 of the cooling pump 1 and the exit 40b.

The fluid pump of the embodiment operates as follows. The impeller 6 (rotor 26) is rotated when the stator winding 25 of the fluid pump 1 is energized so that a rotating magnetic field is established. The liquid in the liquid passage is sucked via the connecting tube 43 and the inlet 10 into the pump chamber 5 by the liquid feeding operation of the first and second pump grooves 13 and 16. Furthermore, the liquid is discharged via the outlet 11 from the pump chamber 5. The liquid discharged out of the pump chamber 5 flows through the connecting tube 42 and then through the liquid passage 40, thereafter being re-sucked via the connecting tub 43 and the inlet 10 into the pump chamber 5.

The liquid circulated through the fluid pump 1 and the liquid passage 40 absorbs heat generated by the CPU 38 via the casing 2 (particularly, the second casing 4) when passing through the pump chamber 5. The heat absorbed by the liquid is further absorbed by the heat radiating panel 39 when the liquid passes through the liquid passage 40. In other words, the CPU 38 is continuously cooled by the liquid recirculated through the fluid pump 1 and the liquid passage 40.

Particularly in the embodiment, the center of rotation of the impeller 6 is located radially away from the center of the casing 2 of the fluid pump 1. Accordingly, the first and second pump grooves 13 and 16 pass by the center of the casing 2 during rotation of the impeller 6.

Furthermore, the impeller 6 comprises the disc 18a and the annular convexity 18b for the purpose of reduction in an axial dimension of the fluid pump 1. The permanent magnet 22 is mounted to the inner circumference of the annular convexity 18b, and the stator 23 is disposed in the area defined by the disc 18a and the annular convexity 18b. Accordingly, the pump grooves 16 provided in the end face of the convexity 18b of the impeller 6 are shorter than the other pump grooves 13. In the embodiment, however, the second casing 4 opposed to the pump grooves 13 is brought into contact with the CPU 38. Consequently, since a large amount of liquid in the pump chamber 5 is caused to pass near the CPU 38, the CPU can be cooled more efficiently.

Even in the conventional fluid pumps, a heating element as an object to be cooled could be mounted to the casing so as to be located away from the center of the casing, whereby a large amount of liquid could pass by the heating element. However, when the heating element is located away from the center of the casing, a part of the heating element is noncontact with the casing, whereupon a contact area of the heating element with respect to the casing is reduced. As a result, the heat radiating effect of the casing is reduced. On the other hand, in the foregoing embodiment, the heating element is disposed near the center of the casing of the fluid pump. Consequently, a sufficient contact area of the heating element can be ensured.

Furthermore, the working efficiency is higher when the heating element is disposed near the center of the casing than when the heating element is disposed away from the center of the casing, whereupon the product quality can be improved.

In a modified form, a heat transfer member (CPU) may be interposed between the heating element and the outer face of the second casing 4 of the fluid pump 1 so that the heating element is brought into a indirect contact with the casing 4.

The heating element may include electric elements other than the CPU 38. Furthermore, the fluid pump may be applied to electric apparatus other than the personal computer.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A cooling fluid pump in which a cooling fluid is caused to flow to cool a heating element, comprising:
   a casing brought into a direct contact or an indirect contact via a heat transfer member with the heating element;
   a pump chamber provided in the casing;
   an impeller rotatably provided in the pump chamber and including a pump groove formed in either one of both axial end faces, the impeller having an axis of rotation located radially away from a center of the casing;
   an inlet formed in the casing so that the cooling fluid is supplied therethrough into the pump chamber by an action of the pump groove with rotation of the impeller; and
   an outlet formed in the casing so that the cooling fluid is discharged therethrough out of the pump chamber by an action of the pump groove with rotation of the impeller.

2. A cooling fluid pump according to claim 1, wherein the casing has a part of an outer face opposed to the pump groove and brought into contact with the heating element.

3. A cooling fluid pump according to claim 1, wherein the pump groove passes near the center of the casing during rotation of the impeller.

4. A cooling fluid pump according to claim 1, wherein the pump groove includes a first pump groove formed in either one of both axial end faces of the impeller and a second pump groove formed in the other axial end face of the impeller, and the first and second pump grooves have axial dimensions differing from each other.

5. A cooling fluid pump according to claim 1, wherein the pump groove extends axially from near a center of rotation of the impeller toward an outer periphery of the impeller and has an open outer peripheral end.

6. A cooling fluid pump according to claim 1, wherein the impeller has an axial end face formed with a circular or annular convexity located nearer to the center of rotation thereof than the pump groove, and the convexity has an outer periphery formed with at least one cavity.

7. A cooling fluid pump according to claim 1, wherein the impeller has a through hole passing the pump groove and extending axially through the impeller.

8. A cooling fluid pump according to claim 4, wherein the impeller has a through hole passing the first and second pump grooves and extending axially through the impeller.

9. A cooling fluid pump according to claim 1, wherein the impeller has an axial end face formed with an annular convexity located nearer to the center of rotation thereof than the pump groove, and the axial end face of the impeller further has a concavity located nearer to the center of rotation thereof than the convexity, the concavity having a circular section, the pump further comprising an annular permanent magnet fixed to an inner circumferential face of the concavity and magnetized so that a multiple of poles are aligned circumferentially, a stator accommodating area formed in the casing so as to be opposed to the concavity so that the substantially overall stator accommodating area is located in the concavity, and a stator disposed in the stator accommodating area and having an outer circumferential face opposed to an inner circumferential face of the permanent magnet, the stator and the permanent magnet constituting an electric motor.

10. A cooling fluid pump in which a cooling fluid is caused to flow to cool a heating element, comprising:
    a casing brought into a direct contact or an indirect contact via a heat transfer member with the heating element;
    a pump chamber provided in the casing and having a center located axially away from a center of the casing;
    an impeller rotatably provided in the pump chamber and including a pump groove formed in either one of both axial end faces, the impeller having an axis of rotation located radially away from a center of the casing;
    an inlet formed in the casing so that the cooling fluid is supplied therethrough into the pump chamber by action of the pump groove with rotation of the impeller; and
    an outlet formed in the casing so that the cooling fluid is discharged therethrough out of the pump chamber by action of the pump groove with rotation of the impeller.

11. An electric apparatus including a heating element, comprising:
    a cooling fluid pump in which a cooling fluid is caused to flow to cool a heating element, the cooling fluid pump including:
      a casing brought into a direct contact or an indirect contact via a heat transfer member with the heating element;
      a pump chamber provided in the casing;
      an impeller rotatably provided in the pump chamber and including a pump groove formed in either one of both axial end faces, the impeller having an axis of rotation located radially away from a center of the casing;
      an inlet formed in the casing so that the cooling fluid is supplied therethrough into the pump chamber by action of the pump groove with rotation of the impeller; and
      an outlet formed in the casing so that the cooling fluid is discharged therethrough out of the pump chamber by action of the pump groove with rotation of the impeller.

12. A personal computer comprising:
    a CPU;
    a cooling fluid pump in which a cooling fluid is caused to flow to cool the CPU, the cooling fluid pump including:
      a casing brought into a direct contact or an indirect contact via a heat transfer member with the CPU;
      a pump chamber provided in the casing;
      an impeller rotatably provided in the pump chamber and including a pump groove formed in either one of both axial end faces, the impeller having an axis of rotation located radially away from a center of the casing;
      an inlet formed in the casing so that the cooling fluid is supplied therethrough into the pump chamber by action of the pump groove with rotation of the impeller; and
      an outlet formed in the casing so that the cooling fluid is discharged therethrough out of the pump chamber by action of the pump groove with rotation of the impeller; and
    a heat radiating plate having a fluid passage with both ends connected to the inlet and the outlet respectively.

* * * * *